United States Patent
Harada et al.

(10) Patent No.: US 7,990,474 B2
(45) Date of Patent: Aug. 2, 2011

(54) IMAGE CORRECTION CIRCUIT, IMAGE CORRECTION METHOD AND IMAGE DISPLAY

(75) Inventors: Shigeru Harada, Tokyo (JP); Kazuhito Kobayashi, Saitama (JP); Yoshifumi Dochi, Kanagawa (JP); Tomonori Tsutsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 1119 days.

(21) Appl. No.: 11/746,223

(22) Filed: May 9, 2007

(65) Prior Publication Data

US 2007/0273793 A1  Nov. 29, 2007

(30) Foreign Application Priority Data

May 23, 2006   (JP) .................................. 2006-143312

(51) Int. Cl.
  *H04N 5/21* (2006.01)
  *H04N 9/64* (2006.01)

(52) U.S. Cl. .......................... 348/630; 348/631; 348/708

(58) Field of Classification Search .................. 348/630, 348/631, 712, 713, 708, 649–652, 674, 675; 382/167, 162; 358/518–520; H04N 5/21, H04N 9/77, 9/64, 5/202, 9/69
See application file for complete search history.

(56) References Cited

U.S. PATENT DOCUMENTS 6,081,302  A  *  6/2000  Hanai ........................... 348/630
  2002/0140865 A1 * 10/2002 Matsushita et al. ........... 348/631
* cited by examiner

*Primary Examiner* — Sherrie Hsia
(74) *Attorney, Agent, or Firm* — Oblon, Spivak, McClelland, Maier & Neustadt, L.L.P.

(57) ABSTRACT

An image correction circuit capable of easily achieving adaptive color correction on the basis of a luminance correction amount is provided. An image correction circuit includes: a luminance correction section for performing luminance correction on input image data; and a color correction section for performing adaptive color correction on input image data on the basis of the following formula (1):

$$C_{out} \propto C_{in} \times [1 + M \times (\Delta Y/L)] \qquad (1)$$

where Cout represents a chrominance signal after color correction, Cin represents a chrominance signal before color correction, M represents an adaptive color correction magnitude which is a fixed positive value, $\Delta Y$ represents the total amount of luminance correction by the luminance correction section, L represents a fixed positive value satisfying L<(Ymax/2), and Ymax represents maximum luminance of input image data.

9 Claims, 5 Drawing Sheets

IMAGE CORRECTION CIRCUIT, IMAGE CORRECTION METHOD AND IMAGE DISPLAY

CROSS REFERENCES TO RELATED APPLICATIONS

The present invention contains subject matter related to Japanese Patent Application JP 2006-143312 filed in the Japanese Patent Office on May 23, 2006, the entire contents of which being incorporated herein by reference.

BACKGROUND OF THE INVENTION

1. Field of the Invention

The present invention relates to an image correction circuit having a function of performing a correction process on an image signal, an image correction method and an image display.

2. Description of the Related Art

Apparatuses such as television receivers (TVs), VTRs (Video Tape Recorders), digital cameras, television cameras or printers typically have an image processing function which makes image quality correction to an input image, and then outputs the input image (for example, luminance correction functions such as luminance or contrast control, and contour correction). Luminance correction on input image data is effectively applied mainly to a totally dark and low-contrast image or a blurred image.

On the other hand, for example, to make a displayed image vivid, in addition to the above-described luminance correction on input image data, color correction on the input image data is generally performed. More specifically, for example, in TVs displayed on the shelves in mass merchandisers of household electrical appliances, to easily make a displayed image vivid, a technique of increasing a color gain to more than 1 is used to set the color gain to a sufficiently high value.

Moreover, as a technique relating to such luminance correction and such color correction, for example, in Japanese Unexamined Patent Application Publication No. 2000-156871, there is proposed an image processing method in which color correction on input image data is performed according to the amount of luminance correction (a contrast improvement process) on the input image data.

SUMMARY OF THE INVENTION

However, in Japanese Unexamined Patent Application Publication No. 2000-156871, a specific configuration of the image processing method is not shown, so a technique of appropriately achieving adaptive color correction on the basis of a luminance correction amount is not disclosed.

In a contrast improvement process, in general, a γ curve is corrected so as to be steepened in a direction where an input/output characteristic increases, so there is a tendency that colors become paler accordingly. Therefore, adaptive color correction is performed on the basis of a luminance correction amount; however, as described above, to make colors on TVs displayed on the shelves in mass merchandisers of household electrical appliances vivid, the colors are prevented from becoming pale, so the colors are corrected to a direction where the color gain is larger, that is, more strongly. When this tendency is too strong, it is expected that colors in a dark image will become too vivid such as the color of the face of a white person becoming red, thereby the image will appear unnatural.

Further, to perform adaptive color correction, it is necessary to add a suitable circuit, so the complication of circuitry or an increase in circuit size is also an issue.

In view of the foregoing, it is desirable to provide an image correction circuit capable of easily achieving adaptive color correction on the basis of a luminance correction amount, an image correction method and an image display.

Moreover, it is desirable to provide an image correction circuit capable of obtaining a natural image, an image correction method and an image display.

According to an embodiment of the invention, there is provided an image correction circuit including: a luminance correction means for performing luminance correction on input image data; and a color correction means for performing adaptive color correction on input image data on the basis of the following formula:

$$Cout \propto Cin \times [1 + M \times (\Delta Y/L)]$$

where Cout represents a chrominance signal after color correction, Cin represents a chrominance signal before color correction, M represents an adaptive color correction magnitude which is a fixed positive value, $\Delta Y$ represents the total amount of luminance correction by the luminance correction means, L represents a fixed positive value satisfying L<(Ymax/2), and Ymax represents maximum luminance of input image data.

According to an embodiment of the invention, there is provided an image correction method including the steps of: performing luminance correction on input image data; and performing adaptive color correction on input image data on the basis of the above-described formula.

According to an embodiment of the invention, there is provided an image display including: a luminance correction means for performing luminance correction on input image data; a color correction means for performing adaptive color correction on input image data on the basis of the above-described formula; and a display means for displaying an image on the basis of input image data on which luminance correction and adaptive color correction are performed.

In the image correction circuit, the image correction method and the image display according to the embodiment of the invention, color correction is performed on the basis of the above-described formula, so adaptive color correction on input image data according to the total amount $\Delta Y$ of luminance correction is achieved. Moreover, for example, even in the case where $\Delta Y$ is larger than necessary, the chrominance signal Cout after color correction can be prevented from becoming too large by the fixed value L and the adaptive color correction factor M. Further, the denominator dividing $\Delta Y$ is the fixed value L, so the complication of circuitry can be prevented.

In the image correction circuit according to the embodiment of the invention, the above-described color correction means preferably limits the above-described value ($\Delta Y/L$) by a limit line passing through a point (Ymax, A) and a point (L+$\beta$, B) when performing adaptive color correction on the basis of the above-described formula, the limit line being defined on the basis of the graph of a function (1/Y) represented by the inverse of luminance Y of the input image data: where A represent a value which is larger than a function value (1/Ymax) at the maximum luminance Ymax and smaller than a function value (1/L) at the luminance L, that is, a value satisfying [(1/Ymax)<A<(1/L)], $\beta$ represents a fixed value which is positive, negative or 0, and B represents a value which is larger than a function value [1/(L+$\beta$)] at the luminance (L+$\beta$), that is, a value satisfying [B>1/(L+$\beta$)]. In such a configuration, the value ($\Delta Y/L$) is limited by the above-described limit line, so color correction is performed according to the luminance value Y of the input image data. Therefore, in a region on a high luminance side, (ΔY/L) is set to be an appropriate value, and the chrominance signal Cout after color correction can be more effectively prevented from becoming too large.

In the image correction circuit, the image correction method or the image display according to the embodiment of the invention, color correction is performed on the basis of the above-described formula, so adaptive color correction on input image data according to the total amount ΔY of luminance correction can be performed, and the chrominance signal Cout after color correction can be prevented from becoming too large. Moreover, the denominator dividing ΔY is the fixed value L, so simple circuitry can be achieved without complicating the circuitry. Therefore, adaptive color correction on the basis of a luminance correction amount can be easily achieved, and a natural image can be obtained.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
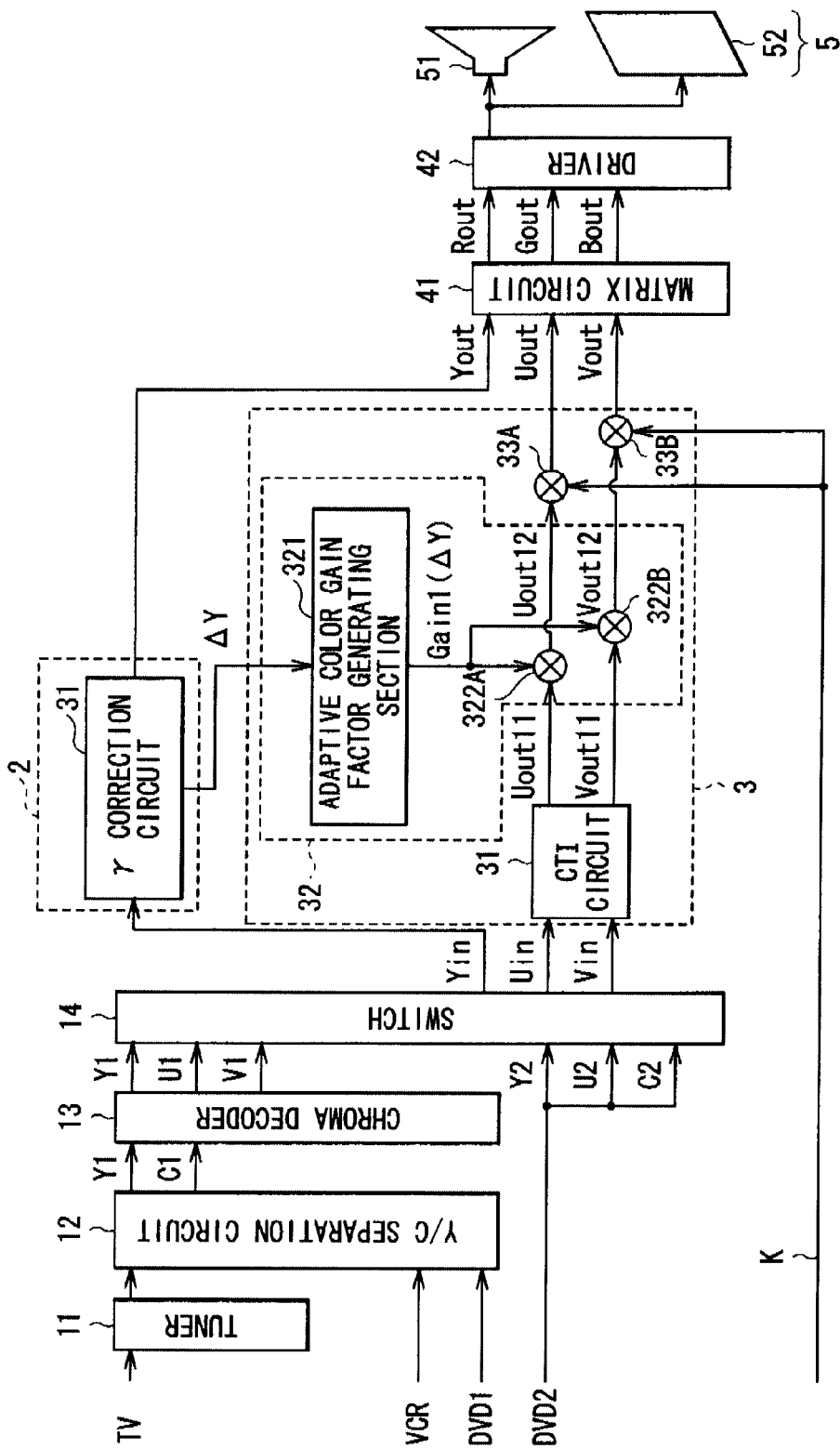
FIG. 1 is a circuit block diagram showing the whole configuration of an image display according to a first embodiment of the invention.

FIG. 1 shows the whole configuration of an image display according to a first embodiment of the invention. The image display includes an image processing function section including a tuner 11, a Y/C separation circuit 12, a chroma decoder 13, a switch 14, a luminance correction section 2 and a color correction section 3, and an image display function section including a matrix circuit 41, a driver 42 and a display 5. An image correction circuit and an image correction method according to a first embodiment of the invention are embodied by the image display according to the embodiment, so they will be also described below.

Image signals inputted into the image display may be outputs from a VCR (Video Cassette Recorder), a DVD (Digital Versatile Disc) or the like in addition to a TV signal from a TV (television). It has become common practice for recent televisions and personal computers (PCs) to obtain image information from a plurality of kinds of media and display an image corresponding to each of the media.

The tuner 11 receives and demodulates the TV signal from the TV, and outputs the TV signal as a composite video burst signal (CVBS).

The Y/C separation circuit 12 separates the composite video burst signal from the tuner 11 or a composite video burst signal from a VCR or a DVD1 into a luminance signal Y1 and a chrominance signal C1 to output them.

The chroma decoder 13 outputs the luminance signal Y1 and the chrominance signal C1 separated by the Y/C separation circuit 12 as YUV signals (Y1, U1, V1) including the luminance signal Y1 and color-difference signals U1 and V1.

The YUV signals are image data of a digital image, and a set of pixel values corresponding to a position on a two-dimensional image. A luminance signal Y represents a luminance level, and takes an amplitude value between a white level which is 100% white and a black level. Moreover, a 100% white image signal is 100 (IRE) in a unit called IRE (Institute of Radio Engineers) representing a relative ratio of an image signal. The black level is 0 IRE. On the other hand, the color-difference signals U and V correspond to a signal B-Y produced by subtracting the luminance signal Y from blue (B), and a signal R-Y produced by subtracting the luminance signal Y from red (R), respectively, and when the signals U and V are combined with the luminance signal Y, colors (color phases, chroma saturation, luminance) can be shown.

The switch 14 switches YUV signals from a plurality of kinds of media (in this case, the YUV signals (Y1, U1, V1) and YUV signals (Y2, U2, V2) from a DVD2) so as to output selected signals as YUV signals (Yin, Uin, Vin).

The luminance correction section 2 performs a predetermined luminance correction process on the luminance signal Yin of the YUV signals (Yin, Uin, Vin) outputted from the switch 14, and in the image display according to the embodiment, the luminance correction section 2 includes a γ correction circuit 21 which performs a predetermined contrast improvement process on the luminance signal Yin.

Figure 2:
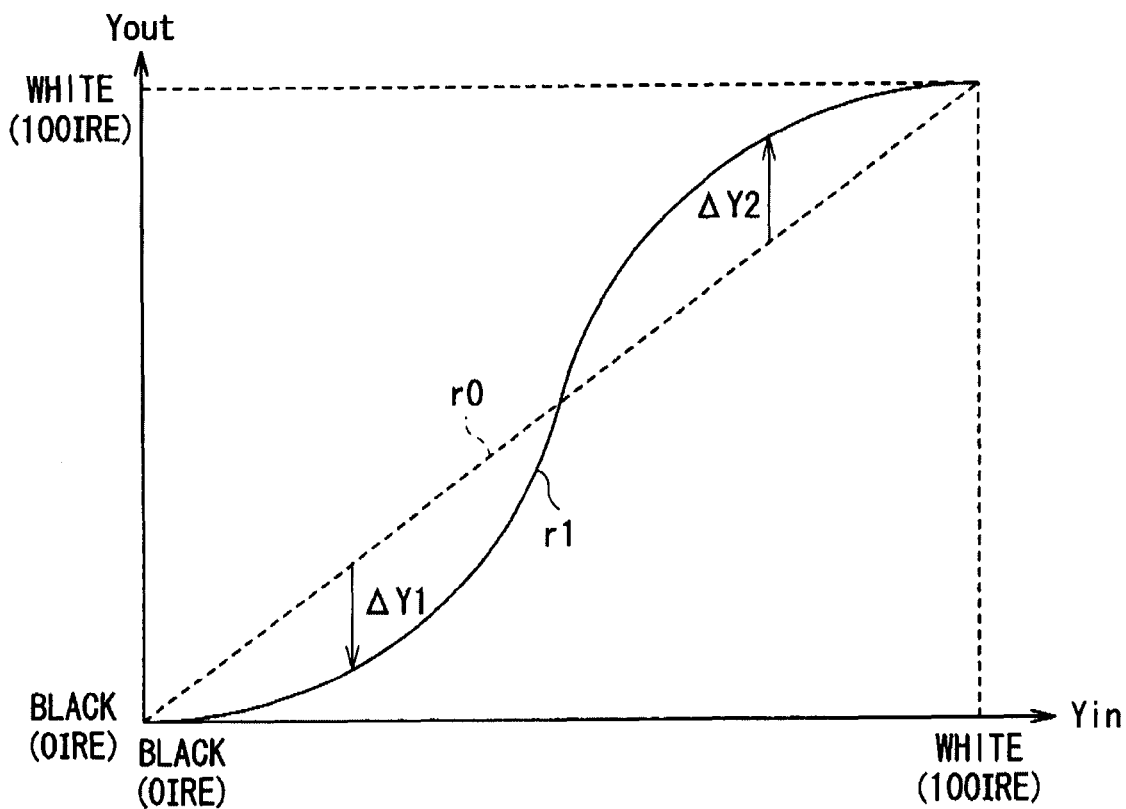
FIG. 2 is a plot for describing a contrast improvement process by a γ correction circuit.

The γ correction circuit 21 performs a contrast improvement process on the luminance signal Yin through the use of an input/output characteristic curve (a γ curve) adaptively generated in each image frame as described above. More specifically, for example, the luminance histogram distribution (not shown) of the luminance signal Yin is acquired in each image frame, and on the basis of the acquired luminance histogram distribution, the luminance gain of the γ curve is adaptively determined in each image frame. Then, for example, as shown in FIG. 2, the luminance gain (for example, luminance correction amounts ΔY1 and ΔY2 in the drawing) determined in each luminance level is added to a reference input/output characteristic line γ0 representing an input luminance signal Yin=an output luminance signal Yout to generate an adaptive γ curve γ1, and the contrast of the input luminance signal Yin is controlled by the γ curve γ1. The γ curve γ1 is set so that the contrast becomes large around a luminance level where the distribution is concentrated according to the frequency of the luminance histogram distribution, thereby the contrast improvement process is effectively performed. Thus, a luminance signal (an output luminance signal Yout) after the luminance correction process (the contrast improvement process) is outputted to the matrix circuit 41 which will be described later. Moreover, the luminance correction amount ΔY in the luminance correction process is outputted to an adaptive color gain factor generating section 321 in the color correction section 3 which will be described later.

The color correction section 3 performs a predetermined color correction process on the color-difference signals Uin and Vin of the YUV signals (Yin, Uin, Vin) outputted from the switch 14, and includes a CTI (color transient improvement) circuit 31, an adaptive color correction section 32 which is a section performing adaptive color correction described below, and a pair of multipliers 33A and 33B which are sections performing color correction through the use of a user color gain factor K as a color gain uniformly set in each image quality mode (for example, an image quality mode for storefront display or living room) or according to user's preference.

The CTI circuit 31 is an effective circuit to improve color transient when the amplitudes of the color-difference signals Uin and Vin are large such as, for example, when displaying an image of color bars.

The adaptive color correction section 32 performs color correction on the basis of the luminance correction amount $\Delta Y$ supplied from the luminance correction section 2 (the $\gamma$ correction circuit 21), and includes an adaptive color gain factor generating section 321 generating a gain factor Gain1 ($\Delta Y$) of such adaptive color correction, and a pair of multipliers 322A and 322B which are sections executing adaptive color correction on the basis of the generated adaptive color correction gain factor Gain1 ($\Delta Y$).

Figure 3:
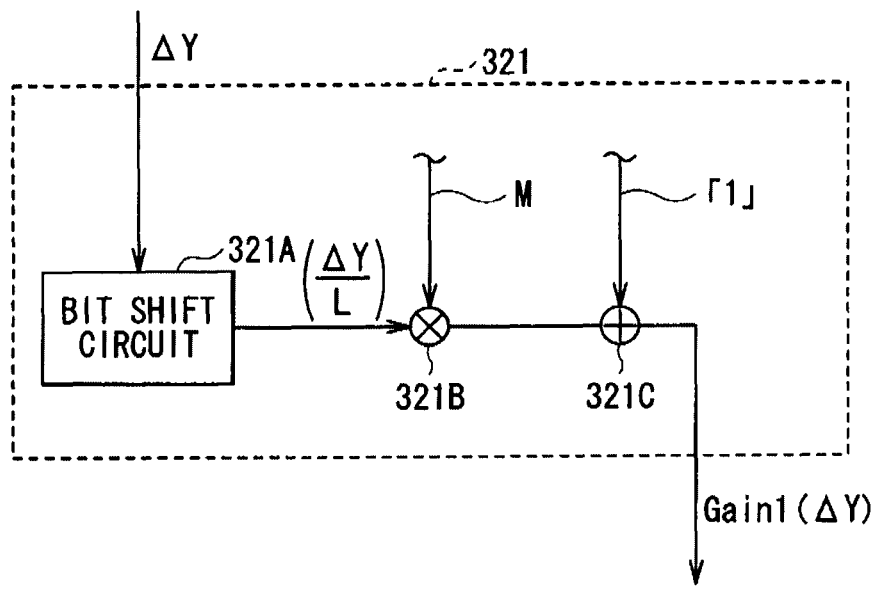
FIG. 3 is a circuit block diagram showing a detailed configuration of an adaptive color gain factor generating section shown in FIG. 1.

FIG. 3 is a detailed circuit block diagram of the adaptive color gain factor generating section 321. The adaptive color gain factor generating section 321 includes a bit shift circuit 321A, a multiplier 321B and an adder 321C.

The bit shift circuit 321A is a circuit which shifts the luminance correction amount $\Delta Y$ supplied from the luminance correction section 2 (the $\gamma$ correction circuit 21) by n bits (n: a fixed value of a positive integer), and outputs a value ($\Delta Y/L$) (that is, in this case, L=2$^n$). More specifically, in the bit shift circuit 321A, for example, in the case where the luminance signal Yin is a 256-gradation signal (in the case of the maximum luminance Ymax=256), 0<2$^n$<128 (=Ymax/2) is established.

The multiplier 321B multiplies the output value ($\Delta Y/L$) from the bit shift circuit 321A by an adaptive color correction magnitude M satisfying 0<M≦3, and outputs a value [M×($\Delta Y/L$)]. Moreover, the adder 321C adds "1" to the value [M×($\Delta Y/L$)], and outputs a value [1+M×($\Delta Y/L$)].

In the adaptive color gain factor generating section 321 with such a configuration, on the basis of the supplied luminance correction amount $\Delta Y$, the adaptive color correction gain factor (which is the function of the luminance correction amount $\Delta Y$) Gain1($\Delta Y$)=[1+M×($\Delta Y/L$)] based on the luminance correction amount $\Delta Y$ is adaptively generated.

Referring back to FIG. 1, the multipliers 322A and 322B are sections executing adaptive color correction on the basis of the luminance correction amount $\Delta Y$ by multiplying color-difference signals Uout11 and Vout11 outputted from the CTI circuit 31 by the adaptive color correction gain factor Gain1 ($\Delta Y$) generated in the adaptive color gain factor generating section 321.

Moreover, the multipliers 33A and 33B are sections executing uniform color correction by multiplying color-difference signals Uout12 and Vout 12 outputted from the multiplier 322A and 322B by the predetermined fixed user color gain factor K. The color-difference signals Uout and Vout after color correction by the multipliers 33A and 33B are outputted to the matrix circuit 41 which will be described later.

In the whole color correction section 3 with such a configuration, color correction represented by the following formulas (11) and (12) is performed on the input color-difference signals Uout11 and Vout11 from the CTI circuit 31, and the corrected color-difference signals Uout11 and Vout11 are outputted as output color-difference signals Uout and Vout. In other words, adaptive color correction (represented by a multiplication by Gain1($\Delta Y$)=[1+M×($\Delta Y/L$)]) on the basis of the luminance correction amount $\Delta Y$ is performed by the adaptive color correction magnitude M, and uniform color correction (represented by a multiplication by the user color gain factor K) by user setting is performed. In some cases, in the formulas (11) and (12), K×Uout11×Gain1($\Delta Y$) or K×Vout11×Gain1($\Delta Y$) may be multiplied by another factor.

$$Uout = K \times Uout11 \times Gain1(\Delta Y) \qquad (11)$$
$$= K \times Uout11 \times [1 + M \times (\Delta Y/L)]$$

$$Vout = K \times Vout11 \times Gain1(\Delta Y) \qquad (12)$$
$$= K \times Vout11 \times [1 + M \times (\Delta Y/L)]$$

Next, the matrix circuit 41 reproduces RGB signals from the luminance signal (the output luminance signal Yout) on which the luminance correction (the contrast improvement process) is performed by the luminance correction section 2 and the color-difference signals Uout and Vout on which the color correction is performed by the color correction section 32, and outputs the reproduced RGB signals (Rout, Gout, Bout) to the driver 42.

The driver 42 produces a driving signal for the display 5 on the basis of the RGB signals (Rout, Gout, Bout) outputted from the matrix circuit 41, and outputs the driving signal to the display 5.

The display 5 displays an image on the basis of the YUV signals (Yout, Uout, Vout) after luminance correction and color correction according to the driving signal outputted from the driver 42. The display 5 may be any kind of display device. For example, a CRT (Cathode-Ray Tube) 51, a LCD (Liquid Crystal Display) 52, a PDP (Plasma Display Panel; not shown) or the like is used.

In this case, the $\gamma$ correction circuit 21 and the adaptive color correction section 32 correspond to specific examples of "an image correction circuit" in the invention, and the $\gamma$ correction circuit 21 corresponds to a specific example of "a luminance correction means" in the invention, and the adaptive color correction section 32 corresponds to a specific example of "a color correction means" in the invention. Moreover, the color-difference signals Uout11 and Vout11 correspond to specific examples of "a chrominance signal Cin before color correction" in the invention, and the color-difference signals Uout12 and Vout12 correspond to specific examples of "a chrominance signal Cout after color correction" in the invention.

Next, the operation of the image display according to the embodiment will be described below referring to FIGS. 1 through 3.

At first, an image signal to be inputted into the image display is demodulated into the YUV signals. More specifically, a TV signal from the TV is demodulated into a composite video burst signal by the tuner 11, and a composite video burst signal is directly inputted into the image display from the VCR or the DVD1. Then, the composite video burst signals are separated into the luminance signal Y1 and the chrominance signal C1 in the Y/C separation circuit 12, and then the luminance signal Y1 and the chrominance signal C1 are decoded into the YUV signals (Y1, U1, V1) in the chroma decoder 13. On the other hand, YUV signals (Y2, U2, V2) are directly inputted into the image display from the DVD 2.

Next, in the switch 14, either the YUV signals (Y1, U1, V1) or the YUV signals (Y2, U2, V2) are selected to be outputted as the YUV signals (Yin, Uin, Vin). Then, the luminance signal Yin of the YUV signals (Yin, Uin, Vin) is outputted into the γ correction circuit 21 in the luminance correction section 2, and the color-difference signals Uin and Vin are outputted to the CTI circuit 31 in the color correction section 3.

In this case, the γ correction circuit 21, on the basis of the luminance signal Yin outputted from the switch 14, a luminance distribution as a histogram distribution is acquired in each image frame, and on the basis of the luminance histogram distribution, the luminance gain of the γ curve is adaptively determined in each image frame. Then, the adaptive γ curve γ1 is generated by the luminance gain (for example, the luminance correction amounts ΔY1 and ΔY2) according to each luminance level, and the contrast of the input luminance signal Yin is controlled through the use of the γ curve γ1 to perform the contrast improvement process. The output luminance signal Yout after the luminance correction process (the contrast improvement process) by the γ correction section 21 in such a manner is outputted to the matrix circuit 41.

On the other hand, in the color correction section 3, the following color correction process is performed.

At first, in the CTI circuit 31, color correction such as color transient improvement is performed on the color-difference signals Uin and Vin outputted from the switch 14 when the amplitudes of the color-difference signals are large such as, for example, when displaying an image of color bars.

Next, in the adaptive color correction section 32, at first, in the adaptive color gain factor generating section 321, on the basis of the luminance correction amount ΔY supplied from the γ correction circuit 21, the adaptive color correction gain factor Gain1(ΔY)=[1+M×(ΔY/L)] based on the luminance correction amount ΔY is adaptively generated.

Next, in the multipliers 322A and 322B, the color-difference signals Uout11 and Vout11 are multiplied by the generated adaptive color correction gain factor Gain1(ΔY), thereby adaptive color correction on the basis of the luminance correction amount ΔY is performed. Moreover, in the multipliers 33A and 33B, the color-difference signals Uout12 and Vout12 after adaptive color correction by the multipliers 322A and 322B are multiplied by the predetermined fixed user color gain factor K, thereby uniform color correction is performed. Thus, the adaptive color correction and the uniform color correction represented by the above-described formulas (11) and (12) are performed in the color correction section 32, and the color-difference signals Uout and Vout after color correction are outputted to the matrix circuit 41.

Then, in the matrix circuit 41, the luminance signal (output luminance signal Yout) after luminance correction (the contrast improvement process) by the luminance correction section 2 and the color-difference signals Uout and Vout after the color correction (adaptive color correction and the uniform color correction) by the color correction section 32 are reproduced into the RGB signals (Rout, Gout, Bout), and in the driver 42, a driving signal is produced on the basis of the RGB signals (Rout, Gout, Bout), and then an image is displayed on the basis of the driving signal on the display 5.

In the image display according to the embodiment, the color correction is performed on the basis of the above-described formulas (11) and (12), so adaptive color correction according to the luminance correction amount ΔY on the input luminance signal Yin is executed.

Moreover, for example, even in the case where the luminance correction amount ΔY is larger than necessary, the color-difference signals Uout and Vout after color correction can be prevented from becoming too large by the fixed value L as a denominator dividing ΔY and the adaptive color correction magnitude M satisfying 0<M≦3. Further, for example, even in the case where the user color gain factor K is larger than necessary, for example, when M is set to be a large amount such as M≧0.5, the degree of the uniform color correction by the user color gain factor K is reduced, and the degree of the adaptive color correction by the adaptive color correction gain factor Gain1(ΔY)=[1+M×(ΔY/L)] is increased. Therefore, also in this case, the color-difference signals Uout and Vout after color correction can be prevented from becoming too large.

Moreover, as described above, the degree of the uniform color correction and the degree of the adaptive color correction can be arbitrarily set depending on a relation between the value of the user color gain factor K (a uniform color correction magnitude) and the value of the adaptive color correction magnitude M, so the degree of freedom of the color correction is improved by these values.

Further, the denominator L dividing the luminance correction amount ΔY is a fixed value, so the complication of circuitry due to additional circuits for such adaptive color correction (the bit shift circuit 321A, the multipliers 321B, 322A and 322B and the adder 321C in the adaptive color correction section 32) is prevented.

As described above, in the embodiment, in the color correction section 3, color correction on the basis of the above-described formulas (11) and (12) is performed, so adaptive color correction according to the luminance correction amount ΔY on the input luminance signal Yin can be performed. Moreover, the denominator dividing the luminance correction amount ΔY is the fixed value L, so simple circuitry can be achieved without complicating the circuitry. Therefore, the adaptive color correction on the basis of the luminance correction amount ΔY can be easily achieved.

Further, the user color gain factor K can be a value close to 1 by the fixed value L as the denominator dividing ΔY and the adaptive color correction magnitude M satisfying 0<M≦3, so the color-difference signals Uout and Vout after color correction can be prevented from becoming too large. Therefore, as the user color gain factor K is a value close to 1, issues such as the face of a white person appearing red, or displaying an unnatural image due to too vivid colors in a dark image can be prevented, and a natural, vivid and highly-colored image can be obtained.

Second Embodiment

Next, a second embodiment of the invention will be described below. An image display according to the embodiment limits (ΔY/L) of the adaptive color gain factor [1+M×(ΔY/L)] by a predetermined line (limit lines 61 and 62 which will be described later) in the color correction section 3 in the image display according to the first embodiment. More specifically, in the adaptive color correction section 32, instead of the adaptive color gain factor generating section 321, an adaptive color gain factor generating section 324 is included. Like components are denoted by like numerals as of the first embodiment and will not be further described.

Figure 4:
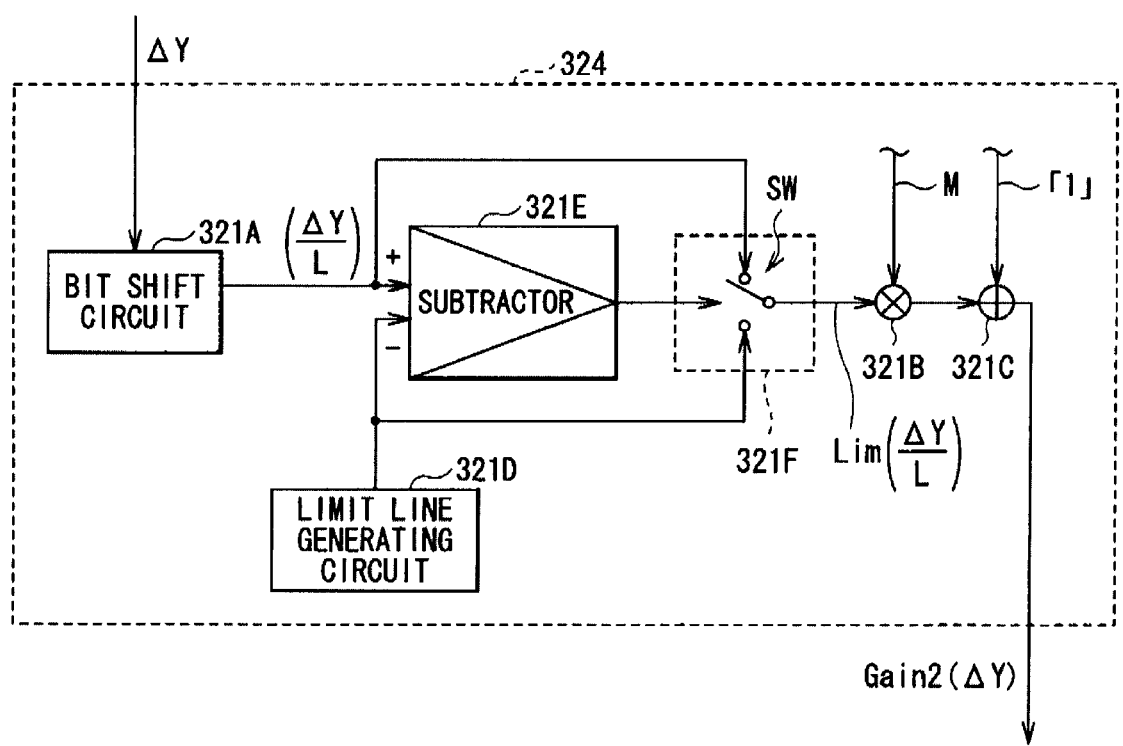
FIG. 4 is a circuit block diagram showing the configuration of an adaptive color gain factor generating section according to a second embodiment of the invention.

FIG. 4 shows a circuit block diagram of the adaptive color gain factor generating section 324 in the embodiment. In addition to the bit shift circuit 321A, the multiplier 321B and the adder 321C in the adaptive color gain factor generating section 321, the adaptive color gain factor generating section 324 includes a subtractor 321E and a selector 321F between the bit shift circuit 321A and the multiplier 321B, and includes a limit line generating circuit 321D generating a predetermined limit line to be supplied to the subtractor 321E and the selector 321F.

The limit line generating circuit 321D generates a limit line for limiting the output value ($\Delta Y/L$) from the bit shift circuit 321A. The subtractor 321E subtracts a value by the generated limit line from the output value ($\Delta Y/L$) from the bit shift circuit 321A, and the selector 321F selects and outputs either of the output value ($\Delta Y/L$) from the bit shift circuit 321A and the value by the limit line on the basis of a subtraction output value by the subtractor 321E, more specifically depending on whether the subtraction output value is positive or negative. In such a configuration, in the subtractor 321E and the selector 321F, when the output value ($\Delta Y/L$) from the bit shift circuit 321A and the value by the limit line are compared, and the output value ($\Delta Y/L$) is smaller than the value by the limit line, the output value ($\Delta Y/L$) is outputted, and when the output value ($\Delta Y/L$) is larger than the value by the limit line, the value by the limit line is outputted, thereby the output value ($\Delta Y/L$) from the bit shift circuit 321A is limited to the value by the limit line or less. The limited output value from the selector 321F (hereinafter referred to as $\mathrm{Lim}(\Delta Y/L)$) is multiplied by the adaptive color correction magnitude M by the multiplier 321B, and "1" is added to the multiplied value by the adder 321C, and the result is outputted to the multipliers 322A and 322B as an adaptive color correction gain factor $\mathrm{Gain2}(\Delta Y)=[1+M\times\mathrm{Lim}(\Delta Y/L)]$.

Figure 5:
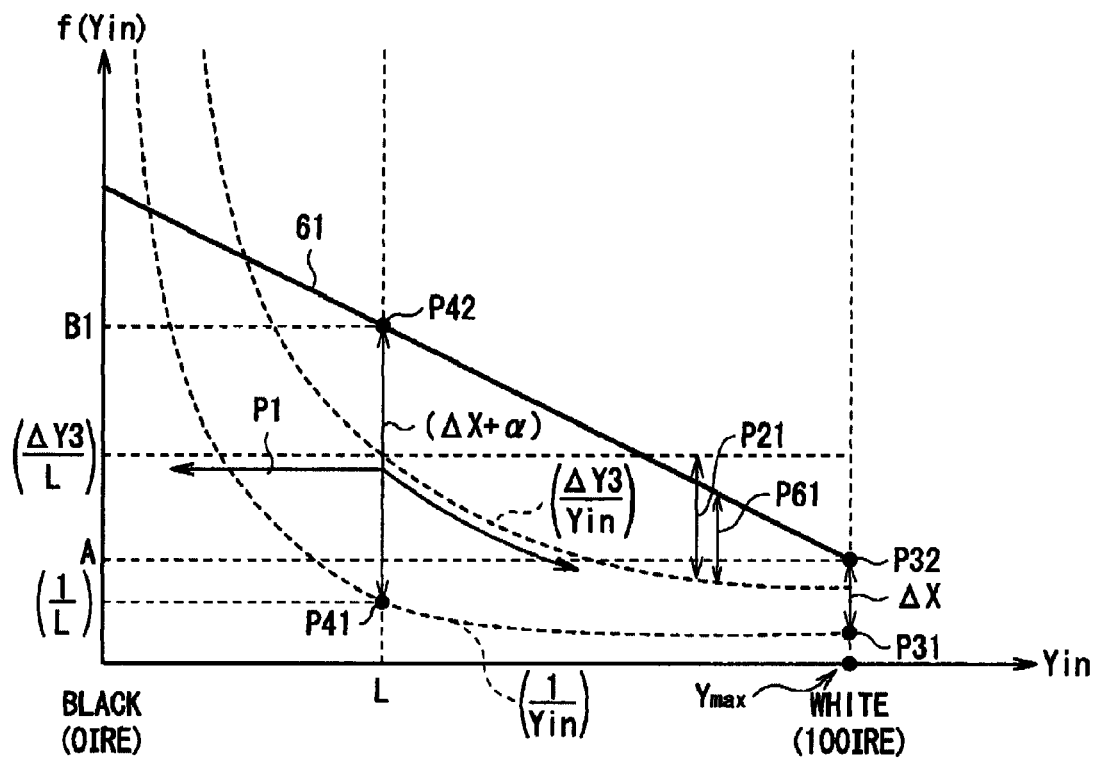
FIG. 5 is a plot for describing an example of a method of generating a limit line.
Figure 6:
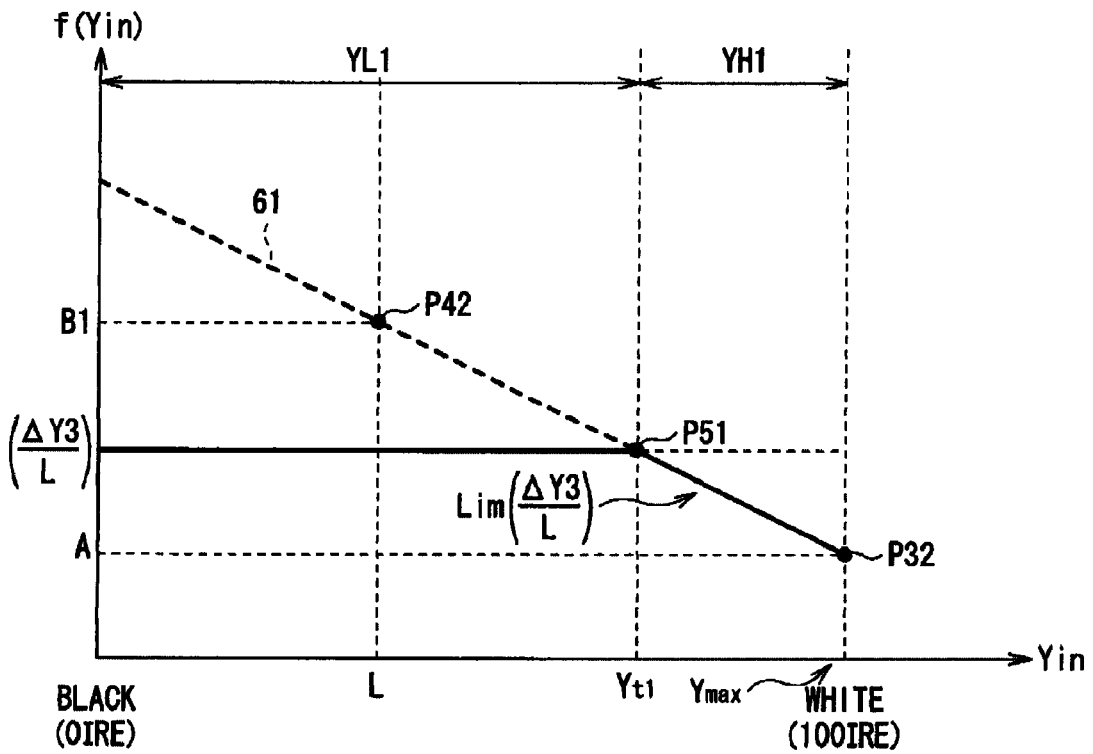
FIG. 6 is a plot for describing limiting operation by the limit line shown in FIG. 5.
Figure 7:
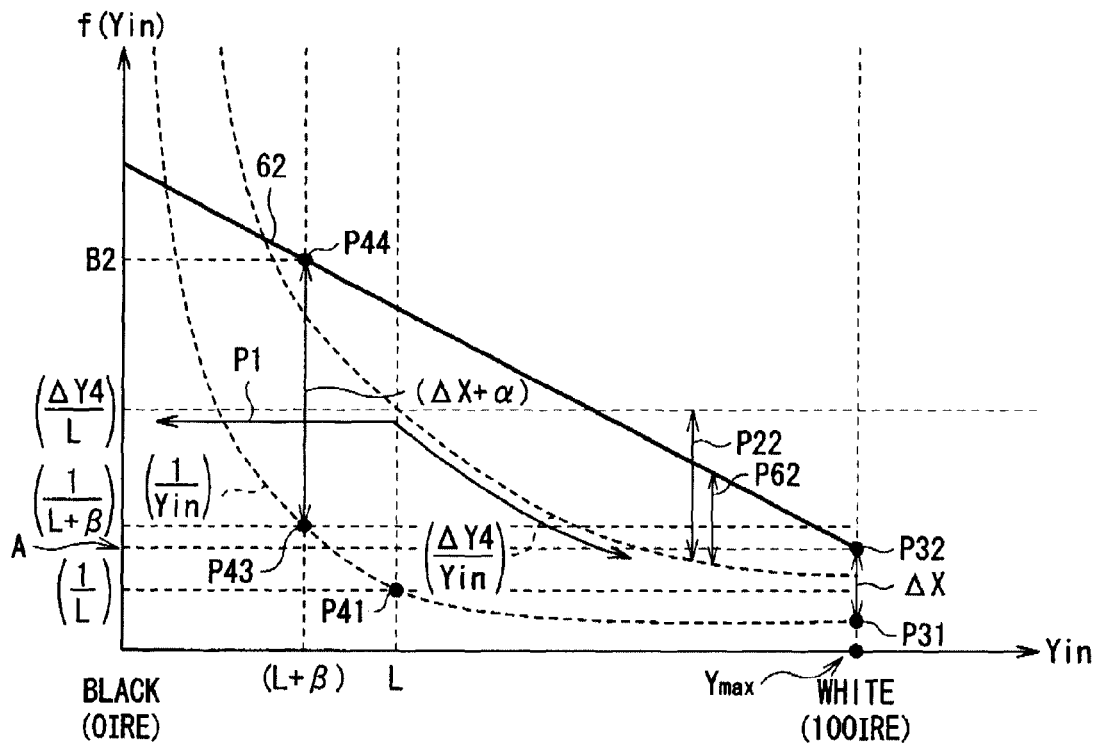
FIG. 7 is a plot for describing a modification of a method of generating a limit line.
Figure 8:
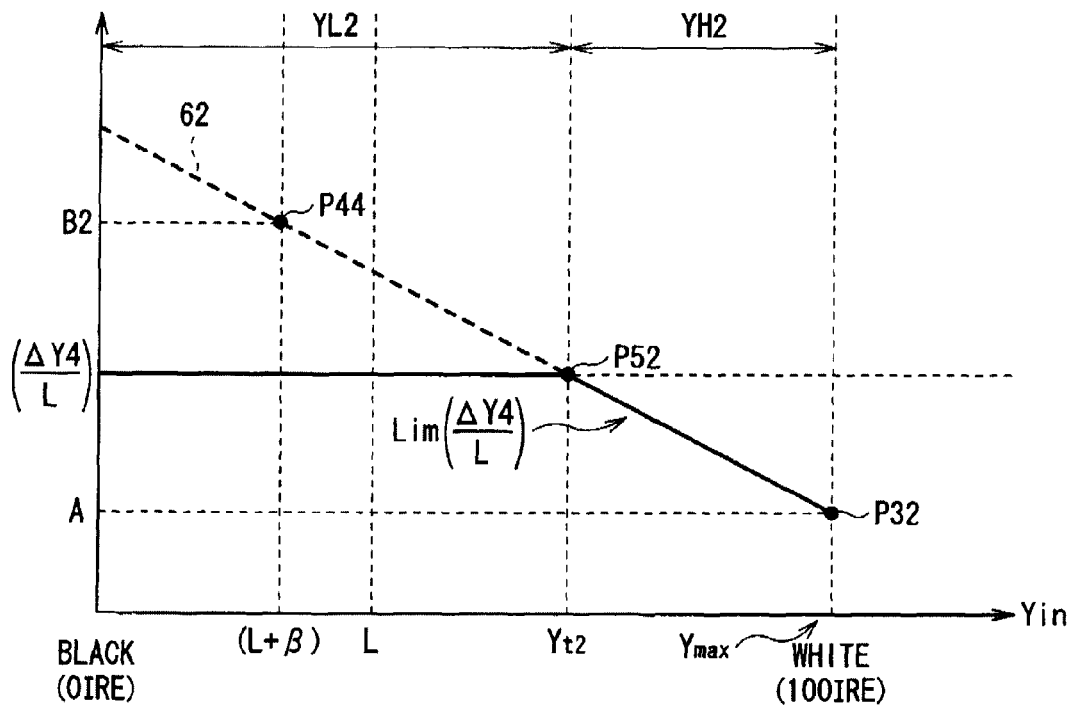
FIG. 8 is a plot for describing limiting operation by the limit line shown in FIG. 7.

Referring to FIGS. 5 through 8, a method of generating a limit line in the embodiment, and limiting operation by the limit line will be described below in detail. FIGS. 5 and 7 show the method of generating the limit line by the limit line generating circuit 321D. FIGS. 6 and 8 show the operation of limiting the output value ($\Delta Y/L$) from the bit shift circuit 321A by the limit line generated in FIGS. 5 and 7. In these drawings, the horizontal axis represents the input luminance signal Yin, and the vertical axis represents the function value f(Yin) of the input luminance signal Yin. Moreover, in FIGS. 5 and 7, luminance correction amounts $\Delta Y3$ and $\Delta Y4$ represent specific luminance correction amounts ($\gamma$ change amounts) in the $\gamma$ correction circuit 21.

At first, in luminance correction (a contrast improvement process) by the $\gamma$ correction circuit 21, in a low luminance region (a region where the value of Y is small), the effect of improving the contrast is large (as shown in FIG. 2, when the luminance correction amount $\Delta Y1$ is a negative value, an absolute value is large). Therefore, in the case where the luminance correction amount $\Delta Y1$ in this case is normalized by a function f(Yin)=(1/Yin) shown in FIG. 5, and an adaptive color correction gain factor is generated on the basis of the value ($\Delta Y1/\mathrm{Yin}$), the value ($\Delta Y1/\mathrm{Yin}$) becomes extremely large, so the adaptive color correction gain factor becomes too large, thereby a natural image may not be obtained. Therefore, in the low luminance region of the input luminance signal Yin, it is desirable that when the adaptive color correction gain factor is generated, the luminance correction amount $\Delta Y$ is normalized by fixed luminance L (a function f(Yin)=(1/L) as shown in FIG. 5), and the value ($\Delta Y/L$) is used as in the case of the adaptive color correction gain $\mathrm{Gain1}(\Delta Y)$ described in the first embodiment. This is also substantiated based on the subjective assessment of image quality.

On the other hand, in a high luminance region, based on the subjective assessment of image quality, it is desirable that the luminance correction amount $\Delta Y$ is normalized according to the input luminance signal Yin as in the case of the above-described function f(Yin)=(1/Yin), and an adaptive color correction gain factor is generated on the basis of the value ($\Delta Y/\mathrm{Yin}$).

Therefore, in the whole luminance region, in the case where a specific luminance correction amount is, for example, $\Delta Y3$, it is desirable that the luminance correction amount $\Delta Y$ is normalized by a line and a curve represented by P1 in FIG. 5 to generate an adaptive color correction gain factor; however, in such a configuration, the circuitry of the adaptive color gain factor generating section becomes complicated, and the circuit size is increased. In the first embodiment, irrespective of the input luminance signal Yin, in the whole luminance region, the luminance correction amount $\Delta Y$ is normalized by the function f(Yin)=(1/L) which is a fixed value, and on the basis of this, the adaptive color correction gain factor $\mathrm{Gain1}(\Delta Y)=[1+M\times(\Delta Y/L)]$ is generated. Therefore, the configuration of the adaptive color gain factor generating section 321 is simplified, and as shown in FIG. 5, in the low luminance region, the line of a value ($\Delta Y3/L$) matches the line represented by P1, so it is desirable; however, in the high luminance region, as shown by P21, the line of the value ($\Delta Y3/L$) is larger than the curve represented by P1, so the adaptive color correction gain factor is too large.

Therefore, in the adaptive color gain factor generating section 324 according to the second embodiment, a limit line 61 having a negative gradient to the input luminance signal Yin as shown in FIG. 5 is generated by the limit line generating section 321D, and the output value ($\Delta Y/L$) from the bit shift circuit 321A (for example, ($\Delta Y3/L$)) is limited to a value equal to or smaller than a value of the limit line 61 using the subtractor 321E and the selector 321F. In the high luminance region, in the first embodiment, for example, as shown by P21, a difference between a point on the curve represented by P1 and a point on the line of the value ($\Delta Y3/L$) is large, thereby, compared to the case of the curve represented by P1, the adaptive color correction gain factor becomes excessive. On the other hand, in the second embodiment, for example, as shown by P61, a difference between a point on the curve represented by P1 and a point on the limit line 61 is relatively small, thereby, compared to the case of the curve represented by P1, the adaptive color correction gain factor is effectively prevented from becoming excessive.

More specifically, for example, as shown in FIG. 5, the limit line 61 is a line passing through two points P32 and P42 on the basis of two point P31 and P41 in the graph of the function f(Yin)=(1/Yin), and the coordinates of the two points P32 and P42 are represented by the following formulas (13) and (14), respectively. In the formulas, A represents a value which is larger than a function value (1/Ymax) in maximum luminance Ymax, and smaller than a fixed value L, that is, a value satisfying [(1/Ymax)<A<L], B1 represents a value which is larger than a function value (1/L) in luminance, that is, a value satisfying L[B1>(1/L)], $\alpha$ is a fixed value which is positive, negative or 0, and $\Delta X$ is a fixed positive value. When $\alpha$ is positive, the gradient of the limit line 61 becomes more negative (the line is easily steepened), so $\alpha$ is preferably a positive value.

$$\text{Coordinates of } P32{:}(Y\text{max},A)=(Y\text{max},(1/Y\text{max})+\Delta X) \quad (13)$$

$$\text{Coordinates of } P42{:}(L,B1)=(L,(1/L)+(\Delta X+\alpha)) \quad (14)$$

Moreover, more typically, as in the case of the limit line 62 shown in FIG. 7, the limit line may be a line passing through a point P44 on the basis of a point P43 in luminance (L+$\beta$) having the degree of freedom $\beta$ instead of the point 42 on the limit line 61. In other words, the coordinates of the point P44 is represented by the following formula (15), and B2 represents a value which is larger than a function value $[1/(L+\beta)]$ in luminance $(L+\beta)$, that is, a value satisfying $[B2>1/(L+\beta)]$. Also in this case, in the high luminance region, in the first embodiment, for example, as shown by P22, a difference between a point on the curve represented by P1 and a point on the line of the value ($\Delta$Y4/L) is large, thereby, compared to the case of the curve represented by P1, the adaptive color correction gain factor becomes excessive. On the other hand, in the embodiment, for example, as shown by P62, a difference between a point on the curve represented by P1 and a point on the limit line 62 is relatively small, thereby, compared to the case of the curve represented by P1, the adaptive color correction gain factor is effectively prevented from becoming excessive.

$$\text{Coordinates of } P44{:}(L,B2)=((L+\beta),[1/(L+\beta)]+(\Delta X+\alpha)) \quad (15)$$

In this case, providing that the gradient of the limit line 62 is k1, the limit line 62 is a line passing through two points P32 and P44, so the limit line 62 can be represented by the following formulas (16) and (17), and the gradient k1 is determined by a formula (18) from the formulas (16) and (17), and finally, the limit line 62 is represented by a formula (19).

$$f(Y\text{in})-[1/(L+\beta)+(\Delta X+\alpha)]=k1\times[Y\text{in}-(L+\beta)] \quad (16)$$

$$f(Y\text{in})-[(1/Y\text{max})+\Delta X]=k1\times(Y\text{in}-Y\text{max}) \quad (17)$$

$$k1=[f(Y\text{in})-((1/Y\text{max})+\Delta X)]/(Y\text{in}-Y\text{max}) \quad (18)$$

$$[(L+\beta)-Y\text{max}]\times f(Y\text{in})=[(1/(L+\beta)+(\Delta X+\alpha))-((1/Y\text{max})+\Delta X)]\times Y\text{in}-Y\text{max}\times[1/(L+\beta)+(\Delta X+\alpha)]+[(1/Y\text{max})+\Delta X]\times(L+\beta) \quad (19)$$

The values in the limit lines 61 and 62 generated in the adaptive color gain factor generating section 324 in such a manner are compared to the output value ($\Delta$Y/L) from the bit shift circuit 321A in the subtractor 321E and the selector 321F, and are finally outputted to the multipliers 322A and 322B as the adaptive color correction gain factor Gain2($\Delta$Y)= $[1+M\times \text{Lim}(\Delta Y/L)]$. More specifically, when the value ($\Delta$Y/L) is smaller than the values by the limit lines 61 and 62, the value ($\Delta$Y/L) is outputted as is, and when the value ($\Delta$Y/L) is larger than the values by the limit lines 61 and 62, the values by the limit lines 61 and 62 are outputted, thereby the output value ($\Delta$Y/L) from the bit shift circuit 321A is limited to the values by the limit lines or less.

FIGS. 6 and 8 show the limit value f(Yin)=Lim($\Delta$Y3/L), Lim($\Delta$Y4/L) of the output values ($\Delta$Y3/L) and ($\Delta$Y4/L) from the bit shift circuit 321A on the basis of the limit lines 61 and 62 shown in FIGS. 5 and 7. In FIG. 6, in a region YL1 on a lower luminance side than luminance Yt1 corresponding to a point P51 on f(Yin)=Lim($\Delta$Y3/L), the output value ($\Delta$Y3/L) is lower than the limit line 61, so Lim($\Delta$Y3/L)=($\Delta$Y3/L) is established, but on the other hand, in a region YH1 on a higher luminance side than the luminance Yt1, the output value ($\Delta$Y3/L) is higher than the limit line 61, so Lim($\Delta$Y3/L)=(the value by the limit line 61) is established. Likewise, in FIG. 8, in a region YL2 on a lower luminance side than luminance Yt2 corresponding to a point P52 on f(Yin)=Lim($\Delta$Y4/L), the output value ($\Delta$Y4/L) is lower than the limit line 62, so Lim ($\Delta$Y4/L)=($\Delta$Y4/L) is established, but in a region YH2 on a higher luminance side than the luminance Yt2, the output value ($\Delta$Y4/L) is higher than the limit line 62, so Lim($\Delta$Y4/L)=(the value by the limit line 62) is established.

Thus, in the embodiment, the output value ($\Delta$Y/L) from the bit shift circuit 321A is limited by the above-described limit lines 61 and 62, so color correction is performed according to the input luminance signal Yin. Therefore, for example, in the regions YH1 and YH2 on a higher luminance side than the luminance Yt1 and the luminance Yt2, the output value ($\Delta$Y/L) is set to be an appropriate value (the values by the limit lines 61 and 62), and the output value ($\Delta$Y/L) is changed like the line P1 in the drawing, so the color-difference signals Uout and Vout after color correction can be effectively prevented from becoming too large.

As described above, in the embodiment, the limit lines 61 and 62 are generated in the limit line generating circuit 321D, and the output value ($\Delta$Y/L) from the bit shift circuit 321A is limited in the subtractor 321E and the selector 321F, so the output value ($\Delta$Y/L) can be set to be an appropriate value in a high luminance region, and the color-difference signals Uout and Vout after color correction can be effectively prevented from becoming too large. Therefore, compared to the first embodiment, more natural color enhancement can be maintained, and a displayed image can be further improved.

Moreover, without a multiplier, a divider or the like, the output value ($\Delta$Y/L) is limited by the limit lines 61 and 62 passing through two points and the subtractor 321E and the selector 321F, so a limit line can be easily generated, and the output value ($\Delta$Y/L) can be easily limited. Thereby, without complicating the circuitry of the adaptive color gain factor generating section 324, simple circuitry can be achieved. Therefore, also in the embodiment, adaptive color correction on the basis of the luminance correction amount $\Delta$Y can be easily achieved.

In the embodiment, as shown in FIGS. 5 and 7, the case where the limit lines 61 and 62 are generated on the basis of two points determined by adding $\Delta$X or ($\Delta$X+$\alpha$) to two points on the graph of the function f(Yin)=(1/Yin) is described; however, as will be described below, for example, a limit line may be generated on the basis of two points determined by multiplying two points on a graph by $\Delta$Z (a fixed positive value). In other words, providing that two points in this case are P35 and P45, the coordinates of the points are represented by the following formulas (20) and (21).

$$\text{Coordinates of } P35{:}(Y\text{max},A5)=(Y\text{max},(1/Y\text{max})\times\Delta Z) \quad (20)$$

$$\text{Coordinates of } P45{:}(L+\beta,B5)=((L+\beta),1/(L+\beta)\times\Delta Z) \quad (21)$$

Moreover, providing that the gradient of the limit line in this case is k2, two points determined by multiplying by $\Delta$Z are represented by the following formulas (22) and (23), and the gradient k2 is determined by the following formula (24) from formulas (22) and (23), and finally the limit line is represented by a formula (25). In such a configuration, the same effects as those in the embodiment can be obtained.

$$f(Y\text{in})-[\Delta Z/(L+\beta)]=k2\times[Y\text{in}-(L+\beta)] \quad (22)$$

$$f(Y\text{in})-(\Delta Z/Y\text{max})=k2\times(Y\text{in}-Y\text{max}) \quad (23)$$

$$k2=[f(Y\text{in})-(\Delta Z/Y\text{max})]/(Y\text{in}-Y\text{max}) \quad (24)$$

$$[Y\text{max}-(L+\beta)]\times f(Y\text{in})=[(1/Y\text{max})-1/(L+\beta)]\times\Delta Z\times Y\text{in}+Y\text{max}\times\Delta Z\times[1/(L+\beta)]-\Delta Z\times(L+\beta)\times(1/Y\text{max}) \quad (25)$$

The present invention is described referring to the first embodiment and the second embodiment; however, the invention is not limited to them, and can be variously modified.

For example, in the above-described embodiments, the case where the luminance correction section 2 includes the $\gamma$ correction circuit 21 is described; however, the configuration of the luminance correction section 2 is not limited to this, and the luminance correction section 2 may include another circuit for luminance correction such as, for example, a DCT (direct current transmission rate transfer) circuit or a sharpness circuit, thereby adaptive color correction described in the above-described embodiments may be performed on the basis of the total ΔYtotal of the luminance correction amounts in a plurality of circuits for luminance correction. In such a configuration, the same effects as those in the above-described embodiments can be obtained.

Moreover, in the above-described embodiments, the case where the color correction section 3 includes the CTI circuit 31 is described; however, the configuration of the color correction section 3 is not limited to this, and in some cases, the color correction section 3 may not include the CTI circuit 31.

Further, in the above-described embodiments, the case where the value (ΔY/L) is generated by the bit shift circuit 321A (in the case of L=$2^n$) is described; however, for example, the value (ΔY/L) may be generated by a combined circuit including a plurality of bit shift circuits represented by a formula such as L=$2^n+2^{n-1}+2^{n-2}+2^{n-3}+\ldots$.

It should be understood by those skilled in the art that various modifications, combinations, sub-combinations and alterations may occur depending on design requirements and other factors insofar as they are within the scope of the appended claims or the equivalents thereof.

What is claimed is:

1. An image correction circuit comprising:
    a luminance correction means for performing luminance correction on input image data; and
    a color correction means for performing adaptive color correction on input image data on the basis of the following formula (1):

$$\text{Cout} \propto \text{Cin} \times [1+M \times (\Delta Y/L)] \quad (1)$$

where Cout represents a chrominance signal after color correction, Cin represents a chrominance signal before color correction, M represents an adaptive color correction magnitude which is a fixed positive value, ΔY represents the total amount of luminance correction by the luminance correction means, L represents a fixed positive value satisfying L<(Ymax/2), and Ymax represents maximum luminance of input image data.

2. The image correction circuit according to claim 1, wherein
    the color correction means limits the value (ΔY/L) by a limit line passing through a point (Ymax, A) and a point (L+β, B) when performing adaptive color correction on the basis of the formula (1), the limit line being defined on the basis of the graph of a function (1/Y) represented by the inverse of luminance Y of input image data:
    where A represent a value which is larger than a function value (1/Ymax) at the maximum luminance Ymax and smaller than a function value (1/L) at the luminance L, that is, a value satisfying [(1/Ymax)<A<(1/L)], β represents a fixed value which is positive, negative or 0, and B represents a value which is larger than a function value [1/(L+β)] at the luminance (L+β), that is, a value satisfying [B>1/(L+β)].

3. The image correction circuit according to claim 2, wherein
    the following formulas (2) and (3) are satisfied:

$$A=(1/Y\max)+\Delta X \quad (2)$$

$$B=[1/(L+\beta)]+(\Delta X+\alpha) \quad (3)$$

where α represents a fixed value which is positive, negative or 0, and ΔX represents a fixed positive value.

4. The image correction circuit according to claim 2, wherein
    the following formulas (4) and (5) are satisfied:

$$A=(1/Y\max)\times\Delta Z \quad (4)$$

$$B=[1/(L+\beta)]\times\Delta Z \quad (5)$$

where ΔZ represents a fixed positive value.

5. The image correction circuit according to claim 1, wherein
    the following formulas (6) and (7) are satisfied:

$$\text{Cout} \propto K \times \text{Cin} \times [1+M \times (\Delta Y/L)] \quad (6)$$

$$0<M\leq 3 \quad (7)$$

where K represents a user color gain factor which is a fixed positive value.

6. An image correction method comprising the steps of:
    performing luminance correction on input image data; and
    performing adaptive color correction on input image data on the basis of the following formula:

$$\text{Cout} \propto \text{Cin} \times [1+M \times (\Delta Y/L)]$$

where Cout represents a chrominance signal after color correction, Cin represents a chrominance signal before color correction, M represents an adaptive color correction magnitude which is a fixed positive value, ΔY represents the total amount of luminance correction, L represents a fixed positive value satisfying L<(Ymax/2), and Ymax represents maximum luminance of input image data.

7. An image display comprising:
    a luminance correction means for performing luminance correction on input image data;
    a color correction means for performing adaptive color correction on input image data on the basis of the following formula; and
    a display means for displaying an image on the basis of input image data on which luminance correction and adaptive color correction are performed:

$$\text{Cout} \propto \text{Cin} \times [1+M \times (\Delta Y/L)]$$

where Cout represents a chrominance signal after color correction, Cin represents a chrominance signal before color correction, M represents an adaptive color correction magnitude which is a fixed positive value, ΔY represents the total amount of luminance correction by the luminance correction means, L represents a fixed positive value satisfying L<(Ymax/2), and Ymax represents maximum luminance of input image data.

8. An image correction circuit comprising:
    a luminance correction section performing luminance correction on input image data; and
    a color correction section performing adaptive color correction on input image data on the basis of the following formula:

$$\text{Cout} \propto \text{Cin} \times [1+M \times (\Delta Y/L)]$$

where Cout represents a chrominance signal after color correction, Cin represents a chrominance signal before color correction, M represents an adaptive color correction magnitude which is a fixed positive value, ΔY represents the total amount of luminance correction by the luminance correction section, L represents a fixed positive value satisfying L<(Ymax/2), and Ymax represents maximum luminance of input image data.

9. An image display comprising:
    a luminance correction section performing luminance correction on input image data;
    a color correction section performing adaptive color correction on input image data on the basis of the following formula; and a display section displaying an image on the basis of input image data on which luminance correction and adaptive color correction are performed:

$$C_{out} \propto C_{in} \times [1 + M \times (\Delta Y/L)]$$

where Cout represents a chrominance signal after color correction, Cin represents a chrominance signal before color correction, M represents an adaptive color correction magnitude which is a fixed positive value, $\Delta Y$ represents the total amount of luminance correction by the luminance correction section, L represents a fixed positive value satisfying $L<(Y_{max}/2)$, and Ymax represents maximum luminance of input image data.

* * * * *